United States Patent [19]

Ozeki

[11] Patent Number: 5,040,837
[45] Date of Patent: Aug. 20, 1991

[54] SAMPLE PIECE TAKE-OUT DEVICE

[75] Inventor: Jiro Ozeki, Tokyo, Japan

[73] Assignee: Slidex Corporation, Tokyo, Japan

[21] Appl. No.: 432,757

[22] Filed: Oct. 20, 1989

[51] Int. Cl.[5] .............................................. B66C 1/42
[52] U.S. Cl. ..................................... 294/159; 294/1.1; 294/87.1
[58] Field of Search ....................... 294/87.1, 159, 160, 294/162, 163, 27.1, 34, 87.2, 87.28, 1.1; 211/41, 120; 414/330, 404, 749

[56] References Cited

U.S. PATENT DOCUMENTS

| 1,582,337 | 4/1926 | Lindstrom ................. 294/159 X |
| 4,254,880 | 3/1981 | Mangel ........................... 211/41 |
| 4,497,127 | 2/1985 | Breslau . | |
| 4,611,845 | 9/1986 | Flemming ................... 294/87.1 |
| 4,867,631 | 9/1989 | Warenback et al. ........ 414/749 X |

FOREIGN PATENT DOCUMENTS

| 1156364 | 7/1956 | France . |
| 1335137 | 7/1962 | France . |
| 521337 | 9/1938 | United Kingdom . |

Primary Examiner—Margaret A. Focarino
Assistant Examiner—Dean J. Kramer
Attorney, Agent, or Firm—Fleit, Jacobson, Cohn, Price, Holman & Stern

[57] ABSTRACT

Device for taking out sample pieces such as mount-attached slide films from a file sheet in which the sample pieces are held and received in an arranged fashion. Conventionally, such sample pieces needed to be taken out independently. A main body is provided with engaging pawls which engage with respective side walls of a plurality of the sample pieces. The plural sample pieces can simultaneously be taken out by moving the main body along the file sheet through a guide. Therefore, operation for taking out the sample pieces from the file sheet can greatly be facilitated.

5 Claims, 5 Drawing Sheets

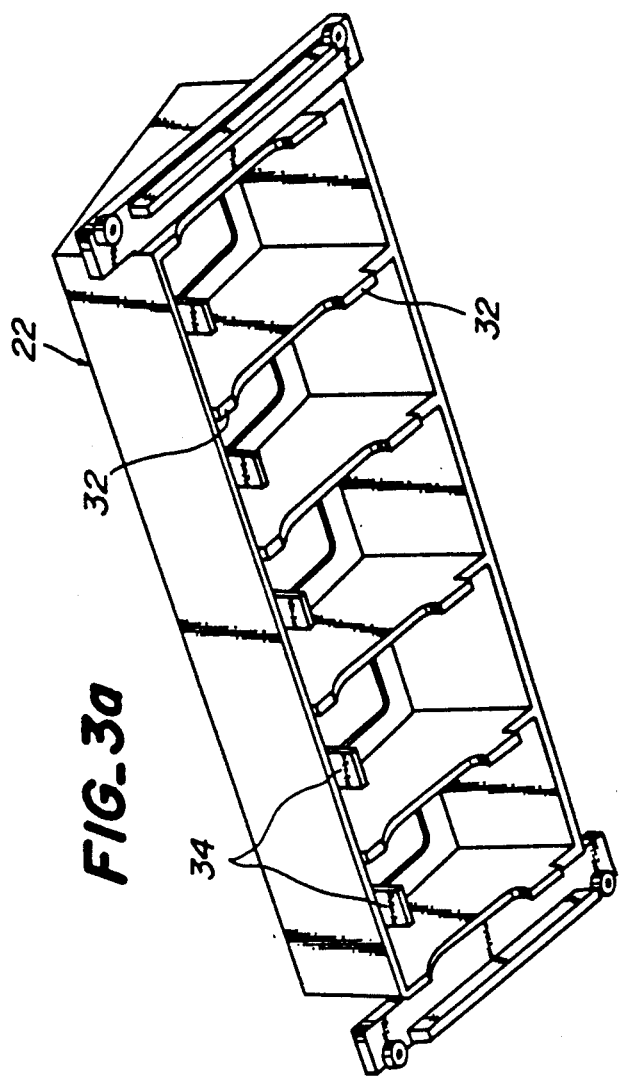
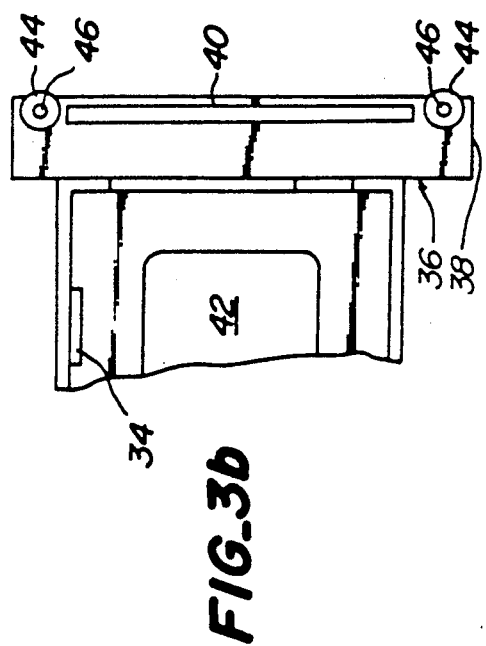
FIG._3a
FIG._3b

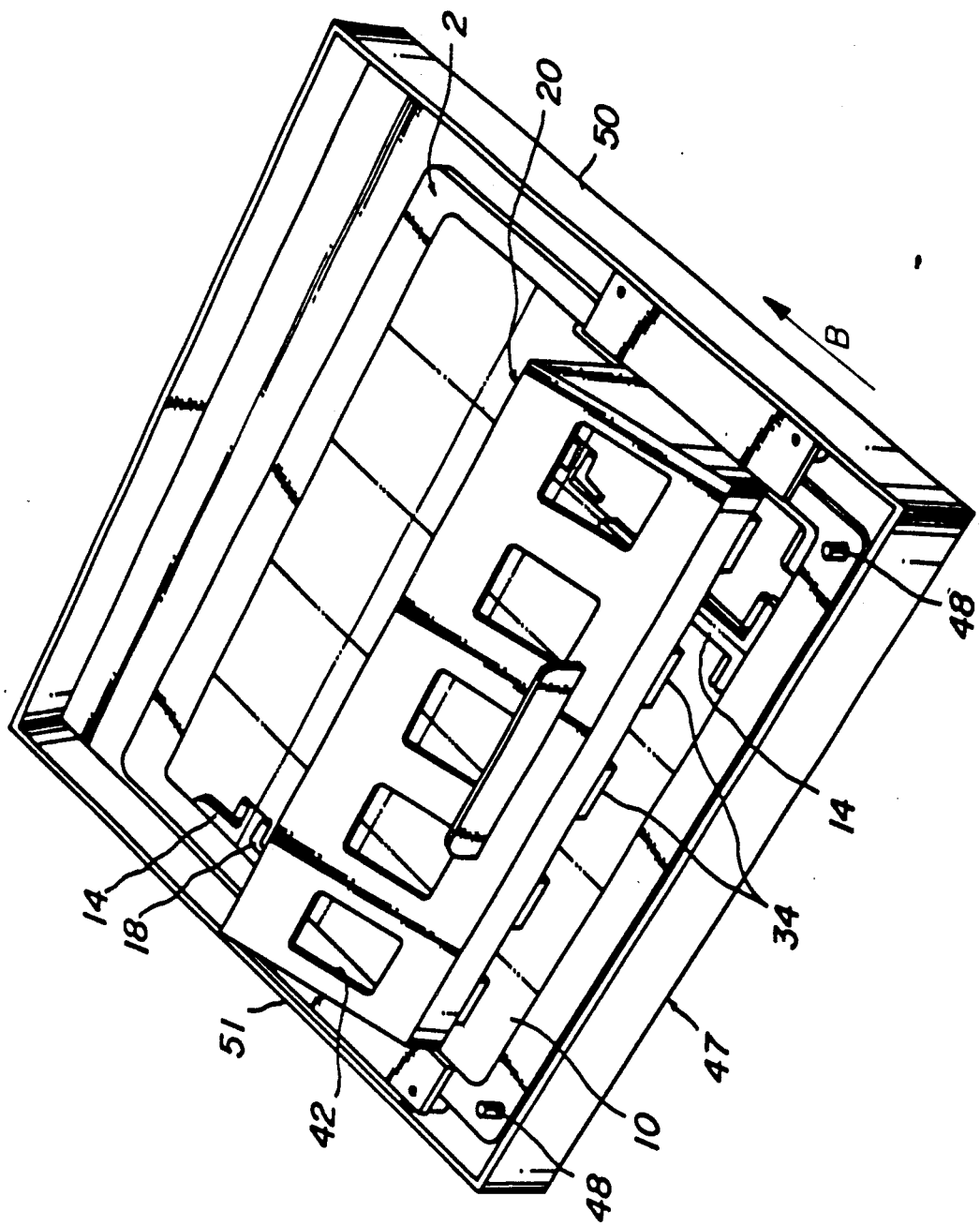

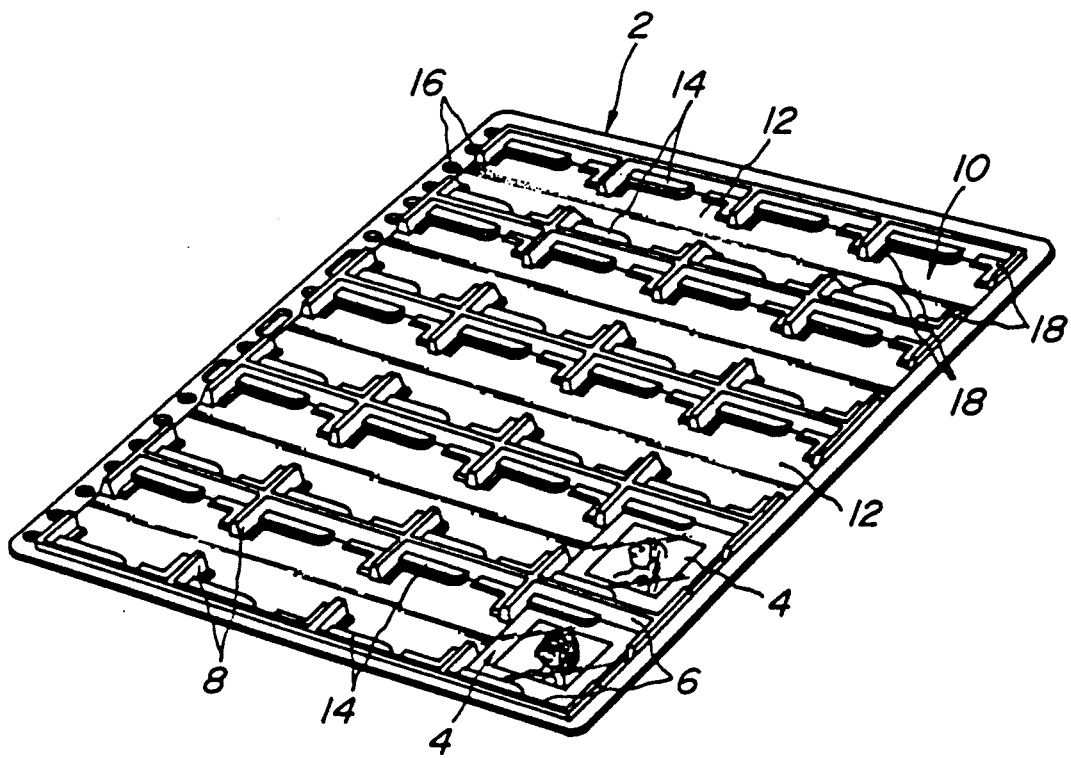
FIG_5
PRIOR ART

SAMPLE PIECE TAKE-OUT DEVICE

TECHNICAL FIELD

The present invention relates to a take-out device capable of simultaneously taking out some of a plurality of sample pieces having a given shape, such as mount-attached slide films, preparations or the like, from a file sheet in which the sample pieces are arranged and held longitudinally and latitudinally.

BACKGROUND TECHNIQUE

In order to arrange and hold sample pieces having a given shape, such as mount-attached slide films, preparations or the like, it is advantageous to use, for instance, a file sheet shown in FIG. 5, which is integrally molded from a plastic sheet.

The file sheet 2 is provided with side walls 6 extending in a direction of inserting sample pieces 4 while spaced from one another, and partition walls 8 projecting from the respective side walls in a cross direction thereto. A plurality of recesses 10 are formed by the side walls and the partition walls for receiving the sample pieces. The recesses have substantially a rectangular shape, and are positioned substantially in the same plane. Hold pieces 14 are formed by cutting up a bottom wall 12 and inwardly projecting cut-up portions from the opposite side walls 6. Binding holes 16 are provided in one arbitrary side portion of the file sheet for binding and arranging such file sheets in a laminated fashion. A reference numeral 18 is a pillow for supporting the sample piece received in the recess while spacing it from the bottom wall.

In order that the mount-attached slide films as the sample pieces 4 may be placed in the file sheet 2, an edge of one end of the slide film 4 is obliquely contacted with the bottom wall 12 of the recess 10, and then the slide film is pushed obliquely downwardly. By so doing, the mount-attached slide film 4 is placed inside the recess 12, and is held between the hold pieces 14 and the pillow. The slide film 4 does not float or slip therefrom. In the case of a file sheet having no pillows, the slide film is held between the hold pieces 14 and the bottom wall 12.

On the other hand, in order to take out the slide film 4 placed in the file sheet, it has only to be pushed in a direction reverse to the film-inserting direction. The pushed slide film is obliquely upwardly pushed out along corner portions of the recess which are spaced from the hold pieces.

However, it is a very troublesome operation to independently take out a plurality of the slide films 4 longitudinally and latitudinally arranged in the file sheet 2 from the respective recesses 12. Further, the direction in which the slide films 6 are correctly inserted with respect to the file sheet 2 is changed during the taking-out operation.

The present invention has been accomplished in view of the problems mentioned above, and to provide a sample piece take-out device which allows simultaneous taking out of a plurality of sample pieces placed in a file sheet.

DISCLOSURE OF THE INVENTION

Particularly, the sample piece take-up device particularly comprises a main body in which are contiguous a plurality of receptacle portions each having a shape corresponding to that of a sample piece, engaging pawls which are provided in each of the receptacle portions, project toward bottom walls of recesses of a file sheet, and each are adapted to engage with a side wall of a sample piece, and guiding means for guiding the main body in an extending direction of the recesses.

Thus, after the device for taking out the sample pieces from the file sheet is arranged opposed to mount-attached slide films placed in the file sheet, the sample piece take-out device is moved in a direction reverse to the inserting direction of the sample pieces under action of the guiding means. By so doing, the engaging pawls engage with the respective sides of the respective slide films located in the recesses, and push the slide films in a moving direction. Consequently, as the main body moves, the slide films are released from engagement with the hold pieces, pushed out from the recesses, and placed in the receptacle portions having the shape corresponding to that of the sample pieces.

Subsequently, when the device is moved in a direction reverse to the inserting direction of the sample pieces, the slide films in the other recesses successively arranged can continuously be taken out.

Therefore, the sample pieces can rapidly and easily be taken out from the file sheet. Further, since those taken-out slide films are placed in the receptacle portions as they are inserted in the recesses, the direction of the slide films will not change on placing the sample pieces to the receptacle portions of the device. Therefore, their arrangement is facilitated itself.

BRIEF DESCRIPTION OF THE DRAWINGS

FIGS. 3(a) and (b) are a perspective view illustrating another embodiment according to the present invention and an enlarged view for illustrating a part thereof in an enlarged manner;

FIG. 4 is a diagrammatical view showing a state that the sample pieces are extracted from the file sheet fixed to a box body by using the device shown in FIG. 3; and FIG. 5 is a perspective view illustrating a file sheet for receiving the sample pieces.

BEST MODE FOR PRACTICING THE INVENTION

In the following, the embodiments according to the present invention will be explained with reference to the drawings.

Figure 1:
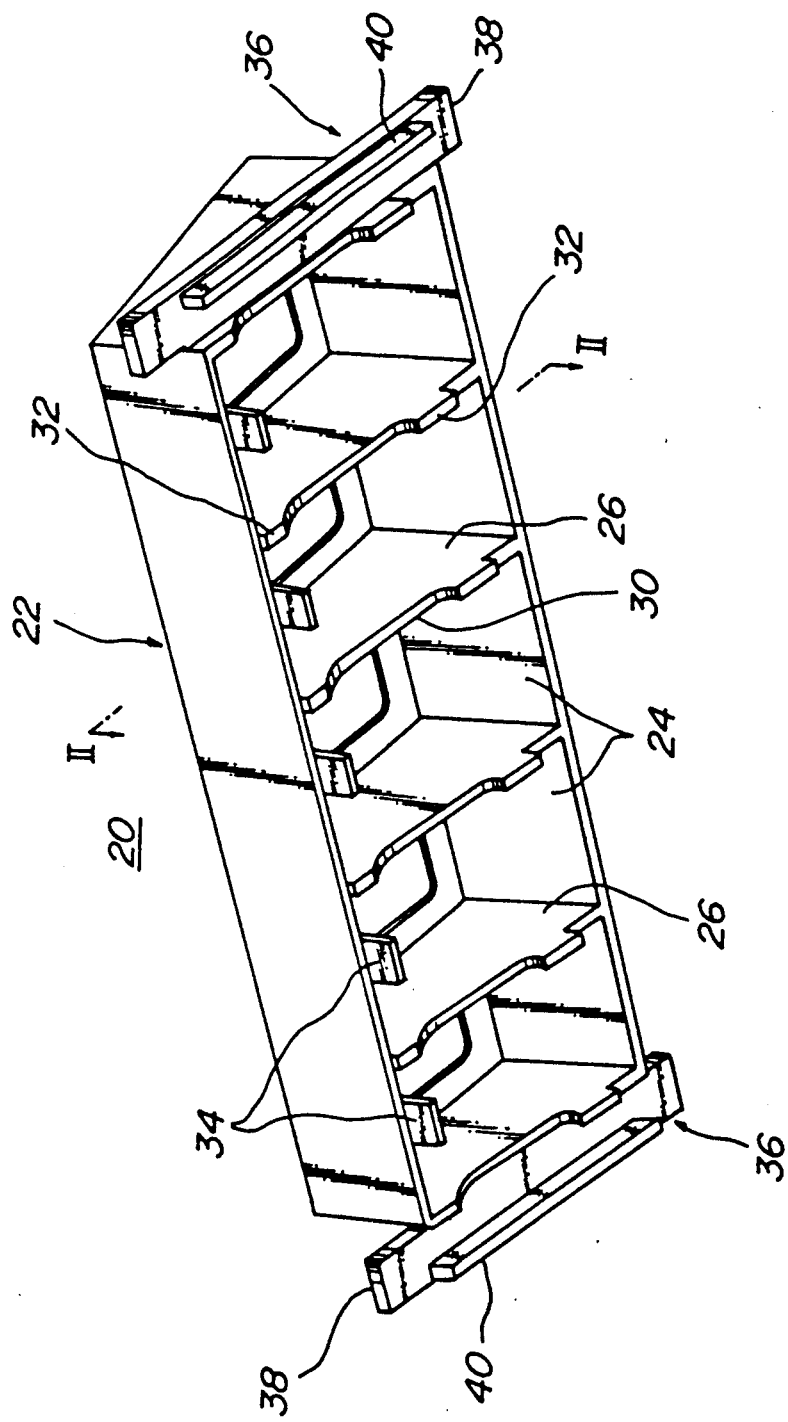
FIG. 1 is a perspective view of a sample piece take-up device according to the present invention as viewed from a side of a file sheet.

FIG. 1 is a perspective view of the sample piece take-out device 20 according to the present invention as viewed from the side of the file sheet into which sample pieces are inserted. The main body 22 is provided with a plurality of receptacle portions 24 longitudinally and latitudinally formed and arranged in the file sheet. For instance, the receptacle portions 24 each have a dimension of shape corresponding to the sample piece having a given shape, such as a mount-attached slide film, a preparation or the like. The receptacle portions 24 are arranged adjacent to each other in a direction crossing the inserting direction of the sample pieces in the file sheet. The number of the receptacle portions is equal to that of recesses of the file sheet in the crossing direction. For instance, as for the file sheet shown in FIG. 5, the number of the receptacle portions of the take-out device is 5 like in this embodiment.

As shown in FIG. 1, an end face 30 of each of partition walls 26 defining receptacle portions 24 and opposed to a top portion of each of the side walls of the file sheet is cut in a concave fashion to be spaced from the file sheet as shown. Sliding portions 32, 32 are provided at the end face 30 while spaced from each other in an extending direction of the partition wall. Therefore, since movement of the partition wall relative to the top portion of the side wall of the file sheet is substantially effected along the sliding portions 32, sliding resistance can be reduced. If necessary, a material having a small coefficient of friction, such as polytetrafluoroethylene may be used for the sliding portion.

An engaging pawl 34 is fixed to each receptacle portion 24, while projecting in a recessed direction of the file sheet. When the sample pieces are to be extracted from the file sheet, the engaging pawls 34 engage with those side walls of the sample pieces inserted in the recesses that are located on the inserting side. In this embodiment, a single engaging pawl 34 is provided for each of the receptacle portions 24. The invention is not limited thereto. A plurality of engaging pawls may be each provided for the respective receptacle portions 24.

Guiding means 36 are provided at opposite ends of the main body 22 in which a plurality of receptacle portions 24 are contingent to each other. The guiding means control the moving direction of the main body 22 relative the file sheet.

The guiding means 36 allows the main body 22 to move in an extending direction of the recess, that is, the inserting direction of the sample pieces, and assures engagement of the engaging pawls 34 with the side walls of the sample pieces. Further, the guiding means 36 prevent contacting between the engaging pawls 34 and the bottom walls 12 of the recesses of the file sheet in cooperation with the sliding portions. In this embodiment, a flange portion 38 is projected outwardly from an end face of the main body 22, and a guiding projection 40 is fixed to the flange portion 38. The guiding projection is extended in the inserting direction of the sample pieces, and has a given height. The guiding projections 40 are designed to engage with the outer peripheral edge of the file sheet in a direction crossing the inserting direction of the sample pieces. As a matter of course, the present invention is not limited to the above guiding means. Any other appropriate guiding means may be used. For instance, the guiding means may be designed to encompass an end edge of a plastic sheet constituting the file sheet.

Next, an operation for taking out the sample pieces from the file sheet shown in FIG. 5 by using the above take-out device will be explained with reference to FIG. 2.

Figure 2A:
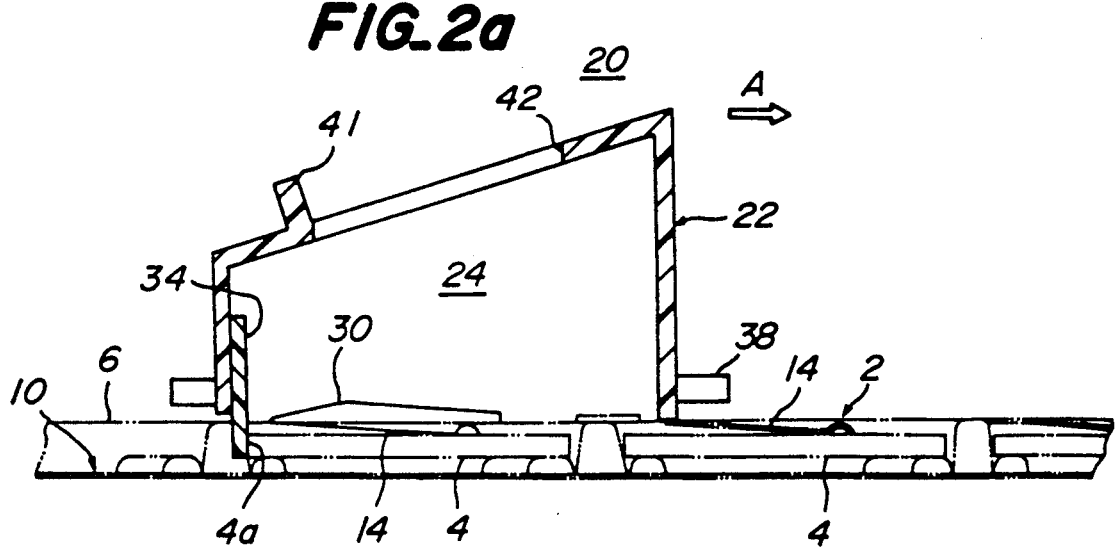
FIGS. 2(a) and (b) are views illustrating a state that sample pieces are being taken out from a file sheet by using the device shown in FIG. 1.
Figure 2B:
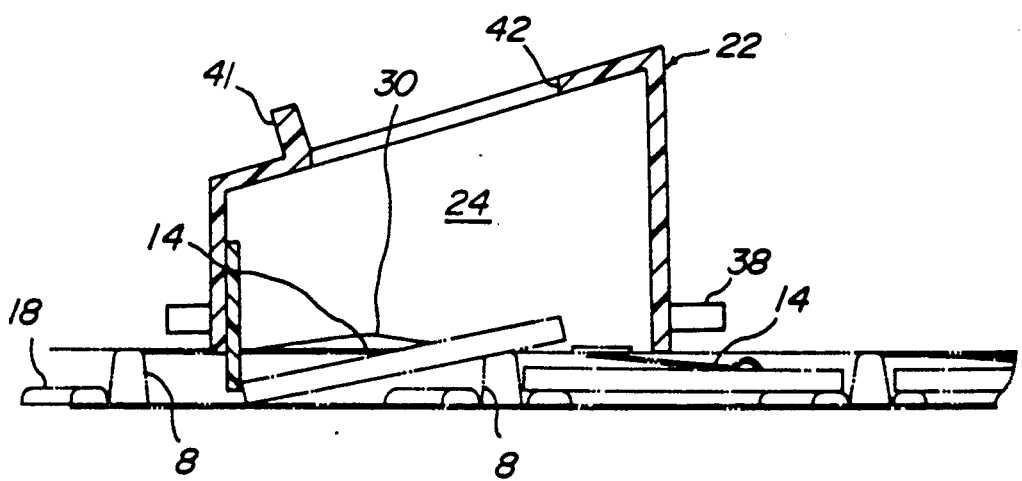

FIG. 2 is a sectional view of FIG. 1 along a line II—II. The take-out device 20 is arranged opposed to the sample pieces 4, such as mount-attached slide films, arranged in the file sheet 2 as illustrated in FIG. 2(a) by imaginary lines. When the sliding portions 32 of the device 20 butt to the respective top portions of the side walls 6 of the file sheet 2, the engaging pawls 34 engage with the side walls 4a of the sample pieces 4 in the recesses 12.

In this state, when the take-out device 20 is moved in a direction reverse to the inserting direction of the sample pieces, that is, in an arrow direction A and in parallel with a plane containing the file sheet 2 while the guiding means 36 engage with the outer peripheral edge of the file sheet 1, the pawl 34 pushes the sample piece 4 in the arrow direction A. That end of the sample piece 4 which is spaced from the engaging pawl is pushed up along the partition wall 8 defining the recess 4.

At that time, since the end of the sample piece on the side of the engaging pawl is pushed down toward the bottom wall 12 of the file sheet by the hold pieces 14, the sample piece 4 is taken out in the same manner as in the manual taking-out operation, and is received in the receptacle portion 24 of the main body, which has the shape corresponding to the sample piece.

The take-out device is moved in the arrow direction A through the sliding portions 32 spaced at the end faces of the partition walls and the top portions of the side walls of the file sheet, and further the moving direction of the device is controlled by the guiding means 36. Thus, the device is moved assuredly in the taking-out direction. A reference numeral 41 is a handle for an operator for facilitating movement of the taking-out apparatus in the arrow direction A of the main body 22 of the take-out device. A reference numeral 42 is an opening formed in the main body to allow for observation of the sample piece received in the receptacle portion.

Another embodiment of the device according to the present invention will be explained with reference to FIGS. 3 and 4.

For simplification purpose, the same reference numerals are given to portions exhibiting the same functions as those of the embodiment shown in FIG. 1, respectively.

As shown in FIGS. 3(a) and (b), the guiding means 36 in this embodiment includes rolling members 44 which are provided at the flange portion 38, while spaced in the extending direction of the guiding projection 40 from opposite ends thereof. A variety of rolling members may be considered. In this embodiment, almost cylindrical rollers 44 are rotatably supported by pins 46, respectively, and a part of each of them projects outwardly from the flange 38.

As shown in FIG. 4, this embodiment of the sample piece take-out device is provided with a sheet-fixing frame 47 for fixing the file sheet 2. A pair of projections 48 project from the inside of the fixing frame 47. When these projections are inserted into at least two of binding holes 16 provided on one side of the file sheet 2, the file sheet 2 can assuredly fixedly be held.

The fixing frame 47 involves a pair of upright walls 50 which are spaced and extended in a direction parallel with the inserting direction of the sample pieces into the file sheet. The upright wall contacts a part of each of the rollers 44 projecting outwardly from the flange portion 38 of the above-mentioned guiding means 36.

In order that the sample pieces may be taken out from the file sheet 2 fixed to the fixing frame 47 by using this device, the device body 20 shown in FIG. 3 is arranged in a direction crossing the inserting direction of the sample pieces 4, and is moved in a direction reverse to the inserting direction of the sample pieces, that is, in an arrow direction B, while a part of each of the rollers 44 constituting the guiding means is contacted with the inner surface of each of upright walls 50 of the sheet-fixing frame 47, which are spaced and extend in parallel.

By so doing, each of the engaging pawls 34 provided in the main body 22 of the device body 20 pushes the side wall of the sample piece 4 received in the recess 10 in the direction reverse to the inserting direction thereof, so that engagement between the sample piece 4 and the hold pieces 14 is released. Consequently, the sample pieces are pushed up obliquely along the corner portions of the file sheet, and held in the respective receptacle portions 24.

At that time, since the device body 20 is moved while the rollers rotate along the side walls 50 of the box-like body, the movement can be effected more smoothly. Further, the guiding projection 40 of the guiding means 36 slides along the bottom wall of the sheet-fixing frame 47 so that the engaging pawls 34 of the device body 20 may assuredly engage with the side walls of the sample pieces 4, and that the engaging pawl may be prevented from contacting the bottom wall 12 of the recess of the file sheet. Industrially Applicable Field:

As described in detail, the sample piece takeout device according to the present invention is arranged on the file sheet into which the sample pieces are inserted, and a plurality of the sample pieces can be simultaneously taken out and received in the receptacle portions of the device by moving the device in a direction reverse to the inserting direction of the sample pieces and in parallel therewith. Accordingly, the sample pieces having a given shape such as mount-attached slide films, can easily be taken out, and a conventionally troublesome take-out operation can be diminished.

Furthermore, when the sample pieces are taken out, the taking-out direction thereof does not vary. Thus, the invention has a merit in that it is unnecessary to rearrange the sample pieces thus taken out.

What is claimed is:

1. A sample piece take-out device for taking out sample pieces having a given shape, such as mount-attached slide films or preparations, from a file sheet, said sample pieces being received in a plurality of recesses provided in a plane of the file sheet while being each held by hold pieces projecting inwardly of each of the recesses, said device comprising
    a main body with a plurality of receptacle portions contiguous to each other having a given shape corresponding to that of the sample pieces,
    engaging pawls each provided in the receptacle portion and extending downwardly from an edge of each of the receptacle portions, and
    guiding means for guiding the main body so that when the take-out device is located opposed to sample pieces placed in the file sheet, said engaging pawls project toward bottom walls of the recesses of the file sheet, and are each adapted to engage with a side wall of the sample piece, and said guiding means guides the main body in the plane of the recesses.

2. The sample take-out device according to claim 1, further comprising a sheet-fixing frame including at least one pair of projections for fixing and holding the file sheet, and a pair of upright walls spaced from each other and in parallel and adapted to engage with the guiding means.

3. A sample piece take-out device for taking out sample pieces having a given shape, such as mount-attached slide films or preparations, from a file sheet, said sample pieces being received in a plurality of recesses provided in a plane of the file sheet while being each held by hold pieces projecting inwardly of each of the recesses, said device comprising
    a main body with a plurality of receptacle portions contiguous to each other having a given shape corresponding to that of the sample pieces,
    engaging pawls each provided in the receptacle portion, said engaging pawls each extending downwardly from an edge of each of the receptacle portions and projecting toward a bottom wall of the recess and each adapted to engage with a side wall of the sample piece located in the plurality of recesses,
    guiding means for guiding the main body in an extending direction of the recesses
    a sheet-fixing frame including at least one pair of projections for fixing and holding the file sheet, and
    a pair of upright walls spaced from each other and in parallel and adapted to engage with the guiding means.

4. In combination, a sample piece take-out device for taking out sample pieces having a given shape, and a file sheet, said sample pieces being received in a plurality of recesses provided in a plane of the file sheet while being each held by hold pieces projecting inwardly of each of the recesses, said sample take-out device including a main body with a plurality of receptacle portions contiguous to each other having a given shape corresponding to that of the sample pieces, engaging pawls each provided in the receptacle portion, each engaging pawls each extending downwardly from an edge of each of the receptacle portions and projecting toward a bottom wall of the recess and each adapted to engage with a side wall of the sample pieces located in the plurality of recesses, and guiding means for guiding the main body in an extending direction of the recesses.

5. The combination according to claim 1, further comprising a sheet-fixing frame including at least one pair of projections for fixing and holding the file sheet, and a pair of upright walls spaced from each other and in parallel and adapted to engage with the guiding means.

* * * * *